(12) United States Patent
Johnson et al.

(10) Patent No.: US 6,487,181 B1
(45) Date of Patent: Nov. 26, 2002

(54) METHOD AND APPARATUS FOR TRANSMITTING AND RECEIVING INFORMATION IN A TIME SLOT

(75) Inventors: Christopher L. Johnson, Chicago, IL (US); Michael W. Loos, Chicago, IL (US); Mark R. Poulin, River Forest, IL (US); Chin P. Wong, Weston, FL (US); Patrick J. Doran, Plantation, FL (US); Martin T. Karanja, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/201,052

(22) Filed: Nov. 30, 1998

(51) Int. Cl.[7] ............................................. G08C 17/00
(52) U.S. Cl. ....................... 370/311; 370/321; 370/337; 370/442; 370/458; 455/13.4; 455/522
(58) Field of Search ................................. 370/311, 280, 370/350, 335, 342, 18, 347, 318, 321, 337, 442, 458, 459; 714/781; 455/522, 13.4

(56) References Cited

U.S. PATENT DOCUMENTS

| | | | |
|---|---|---|---|
| 5,519,730 A | | 5/1996 | Jasper et al. ................ 375/260 |
| 5,570,349 A | * | 10/1996 | Bustamante et al. .......... 370/18 |
| 5,636,208 A | * | 6/1997 | Chang et al. ............... 370/347 |
| 5,790,533 A | * | 8/1998 | Burke et al. ................. 370/318 |
| 5,854,784 A | * | 12/1998 | Solve et al. ................ 370/311 |
| 5,923,648 A | * | 7/1999 | Dutta ......................... 370/280 |
| 6,044,069 A | * | 3/2000 | Wan ........................... 370/311 |
| 6,072,784 A | * | 6/2000 | Agrawal et al. ............. 370/311 |
| 6,256,304 B1 | * | 7/2001 | Vayrynen ..................... 370/350 |
| 6,272,121 B1 | * | 8/2001 | Smith et al. ................. 370/342 |
| 6,286,122 B1 | * | 9/2001 | Alanara ....................... 714/781 |
| 2001/0028637 A1 | * | 10/2001 | Abeta et al. ................. 370/335 |

* cited by examiner

*Primary Examiner*—Hassan Kizou
*Assistant Examiner*—Anh Vu H Ly
(74) *Attorney, Agent, or Firm*—Steven A. May; Jeffrey K. Jacobs

(57) ABSTRACT

A communication device employs a method and apparatus for transmitting and receiving information in a time slot. When transmitting, the communication device generates user information symbols and positions the symbols in a first portion of the time slot. The first portion of the time slot occupies less time than the time slot. The communication device then transmits the user information symbols during the first portion of the time slot only. When receiving, a communication device decodes and then encodes a received time slot, presuming the received time slot is not a truncated time slot. The communication device determines an error metric for the encoded time slot and, based on the error metric, determines whether the encoded time slot is a truncated time slot. When the encoded time slot is a truncated time slot, the communication device processes the user information symbols in the received time slot.

15 Claims, 5 Drawing Sheets

METHOD AND APPARATUS FOR TRANSMITTING AND RECEIVING INFORMATION IN A TIME SLOT

FIELD OF THE INVENTION

The present invention relates generally to wireless communication systems and, in particular, to transmitting and receiving information in a time slot of a time division multiplexed wireless communication system.

BACKGROUND OF THE INVENTION

Economics play an important role in the design of wireless communication systems. Bandwidth is limited and equipment is expensive, and therefore many schemes have been developed for multiplexing many different users over the same physical channel. One such scheme is time division multiple access (TDMA). In a TDMA system, the radio frequency (RF) signal carrying the information is segmented into intervals called time frames. Each frame is further partitioned into assignable user blocks of time called time slots. During each time slot, the assigned user of that slot is entitled to use the full spectrum of the RF signal. Each time slot within a frame might have a different user assigned to it, or one user might be assigned several time slots within a frame. The user of a communication unit, such as a mobile or portable radio or a cellular telephone, continues to occupy the same slot or slots in succeeding time frames until the user terminates his communication, is transferred to another base site, or is transferred to another sector within a base site.

During voice calls in a TDMA system, voice information is included in time slots in a discontinuous fashion. That is, voice information is not typically included in the time slots allocated to the user in every time frame because there are occasional lulls in voice activity when there is no voice information to be transmitted. However, leaving those time slots completely empty of information is undesirable. Providers of wireless communication services feel that a blank transmission during lulls in user activity would be discomforting for the recipient of the transmission, who might wonder as to whether the communication had been terminated. Therefore, background noise is transmitted during the lulls, which background noise indicates to the recipient a continuing connection to the user and a continuing active communication link. In addition, in the "iDEN" system available from Motorola, Inc. of Schaumburg, Ill., system information is also transmitted during the lulls. The system information comprises information that allows the communication infrastructure to monitor the communication unit's continuing presence, timing synchronization, and transmit signal quality. So, although there may not be any voice information to be conveyed, time slots transmitted during the voice activity lulls are nonetheless filled with background noise information and system information.

The drawback with respect to transmitting a completely filled time slot during the voice activity lulls is that the communication unit is transmitting information and consuming power, even though there is no voice information in the contents of the time slot (i.e., the contents of the time slot are of little value to the user of the communication unit). Since the power for operating the communication unit is a limited resource (i.e., the batteries providing the power have a limited life between recharges), minimization of the amount of power consumed by the communication unit in transmitting information during the lulls is a desirable goal. Battery size, rechargeable battery life, and the length of time of communication unit usage between each need to recharge the battery are visible areas of competition among manufacturers of communication units and improvements are constantly being sought that will extend battery life without increasing battery size.

Therefore, a need exists for a method and apparatus for transmitting and receiving information in a time slot at a reduced level of power consumption by the transmitting communication device.

DESCRIPTION OF A PREFERRED EMBODIMENT

Figure 1:
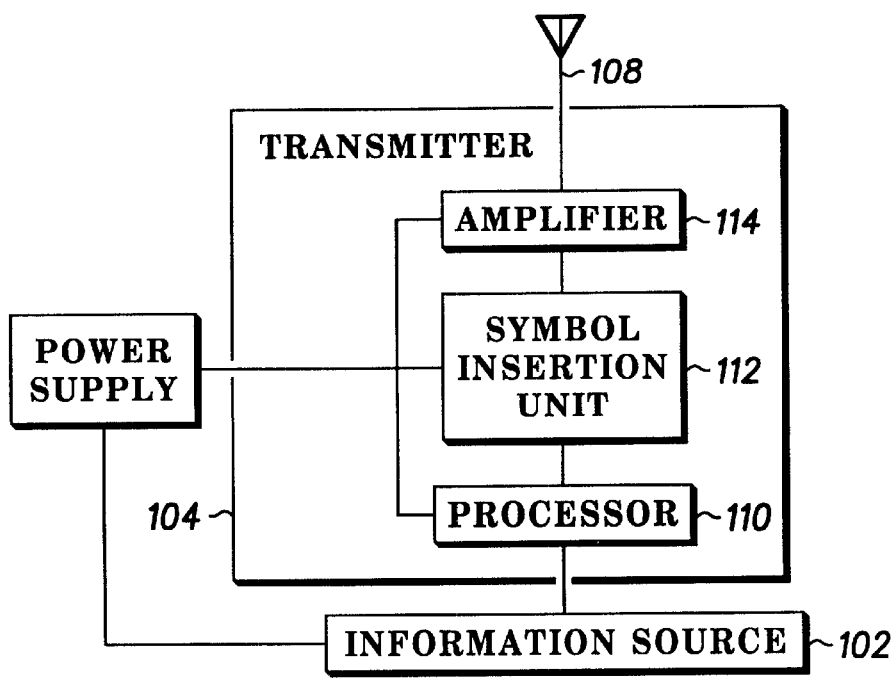
FIG. 1 is a block diagram of a communication device in accordance with a preferred embodiment of the present invention.

To address the need for a method and apparatus for transmitting and receiving information in a time slot at a reduced level of power consumption by the transmitting communication device, a communication device employs a method and apparatus for transmitting and receiving information in a truncated time slot. When transmitting, the communication device generates user information symbols and positions the symbols in a first portion of the time slot. The first portion of the time slot occupies less time than the time slot. The communication device then transmits during the first portion of the time slot only, to produce a truncated time slot. When receiving, a communication device decodes and then encodes a received time slot, presuming the received time slot is not a truncated time slot. The communication device determines an error metric for the encoded time slot and, based on the error metric, determines whether the encoded time slot is a truncated time slot. When the encoded time slot is a truncated time slot, the communication device processes the user information symbols in the received time slot.

Generally, the present invention encompasses a method for transmitting information in a time slot at a reduced level of power consumption by the transmitting communication device. A communication device generates multiple user information symbols. The user information symbols are positioned in a first portion of the time slot, the first portion of the time slot occupying less time than the time slot. The communication device then transmits the first portion of the time slot only.

Another embodiment of the present invention encompasses a method for receiving information contained in a time slot. A time slot is received to produce a received time slot. The received time slot is decoded presuming that the time slot is not a truncated time slot, wherein a truncated time slot occupies less time than a time slot, to produce a decoded time slot. The decoded time slot is encoded presuming that the time slot is not a truncated time slot to produce an encoded time slot. An error metric is determined for the encoded time slot, and a determination is made as to whether the encoded time slot is a truncated time slot based on the error metric. When the encoded slot is determined to be a truncated time slot, the user information symbols in the received time slot are processed presuming the received time slot is a truncated time slot.

Finally, the present invention encompasses a communication device comprising an information source that generates user information symbols, a processing unit, coupled to the information source, that receives the user information symbols and that positions the user information symbols within a first portion of a time slot, the first portion of the time slot occupying less time than the time slot, and a transmitter, coupled to the processing unit, that transmits the user information symbols via a radio communication channel during the first portion of the time slot only.

Turning now to the drawings, wherein like numerals designate like components, FIG. 1 illustrates a communication device 100 in accordance with a preferred embodiment of the present invention. The communication device 100 preferably comprises an "iDEN" radiotelephone and preferably includes an information source 102 and an antenna 108 that are both coupled to a transmitter 104, and a power supply 106 that is coupled to both the information source 102 and the transmitter 104. The transmitter 104 preferably comprises a processor 110, a symbol insertion unit 112, and an amplifier 114, and is capable of transmitting quadrature amplitude modulated (QAM) signals. The information source 102 provides the transmitter 104 with an analog information signal that is to be transmitted. The information source 102 preferably comprises an audio receiver of the communication device 100.

The transmitter 104 processes the analog information signal to produce a bit stream, converts the bit stream into user information symbols, inserts the user information symbols and channel-related information symbols in four separate signal paths, shapes the symbols, mixes each signal path with a signal at a separate offset frequency, and combines, splits, upconverts and amplifies the signal paths to produce an information-bearing radio frequency (RF) signal per the methodology disclosed in detail in U.S. Pat. No. 5,519,730 issued to Jasper, et al., ("Jasper") and assigned to the assignee of the present invention and hereby incorporated by reference herein. The information-bearing RF signal is subsequently transmitted in a time slot assigned to the user of the communication device 100.

Figure 2:
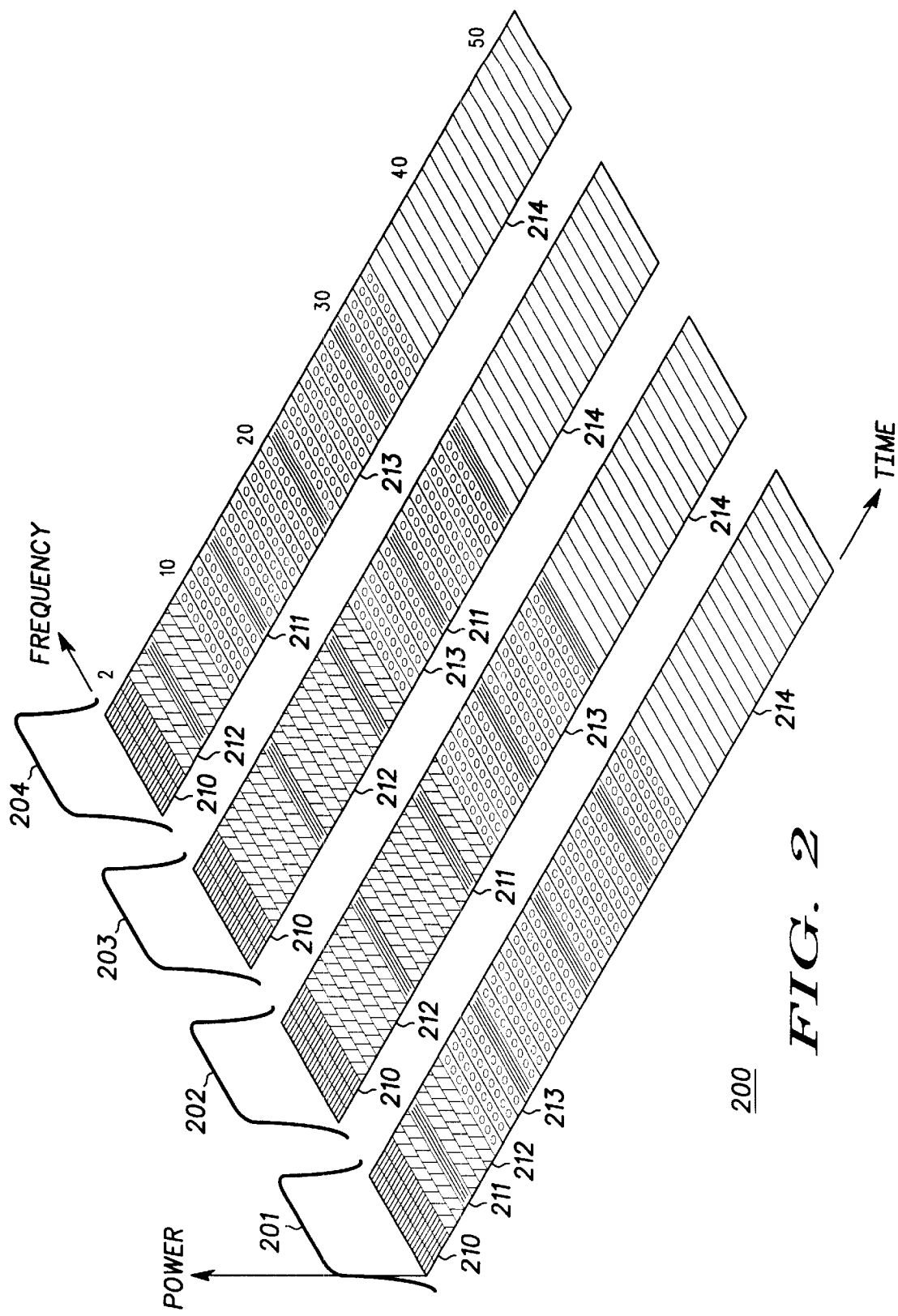
FIG. 2 is a block diagram of information symbols transmitted in a multiple sub-channel time slot in accordance with a preferred embodiment of the present invention.

FIG. 2 is a block diagram of the information symbols transmitted in a time slot 200 as such symbols appear after each signal path of the four signal paths is mixed with a signal at a separate offset frequency to produce a frequency sub-channel. As a result, in the preferred embodiment, the time slot 200 comprises four frequency sub-channels 201–204. Each sub-channel 201–204 is offset from the other sub-channels due to the frequency offsets of the mixing signals described above. Each sub-channel 201–204 in the time slot 200 preferably contains 53 symbol positions for a total of 212 symbol positions in the entire time slot 200. In the preferred embodiment, the transmitter 104 inserts user information symbols 212, 213 into a first portion of the four frequency sub-channels 201–204 in time slot 200 and inserts channel-related information symbols 210, 211 into a second portion of the time slot 200.

In the preferred embodiment, the user information symbols 212, 213 comprise information symbols 212 that are indicative of background noise detected by the communication device 100 during a time period when a user of the communication device 100 is silent (i.e., comfort noise symbols) and low power symbols 213. Preferably, the comfort noise symbols 212 are generated by a known comfort noise algorithm in the transmitter 104. Generally, system providers believe that if a transmission went blank during these lulls, the recipient of the transmission would be discomforted, wondering whether the communication had been terminated. Therefore, during lulls in user voice activity, system providers prefer to continue to transmit something resembling background noise (e.g., the comfort noise symbols 212) which indicates to the recipient that he has a continuing connection to the user and a continuing active communication link.

In the preferred embodiment, the channel-related information symbols 210, 211 comprise multiple synchronization symbols 210 and multiple channel quality symbols 211. Both the synchronization symbols 210 and the channel quality symbols 211 are predetermined information symbols transmitted at transmission times known to both the sending and receiving communication devices. Together, the first portion of the time slot and the second portion of the time slot 200 (i.e., the user information symbols 212, 213 and the channel-related information symbols 210, 211) occupy less time than the entire time slot. By transmitting only the first portion and the second portion of the time slot 200, less than a full time slot is transmitted (i.e., a truncated time slot is transmitted) and less power is consumed by the transmitter 104, thereby increasing the rechargeable life of the power supply 106 (e.g., a battery) and the length of time of communication device 100 usage between each need to recharge the battery 106.

Figure 3:
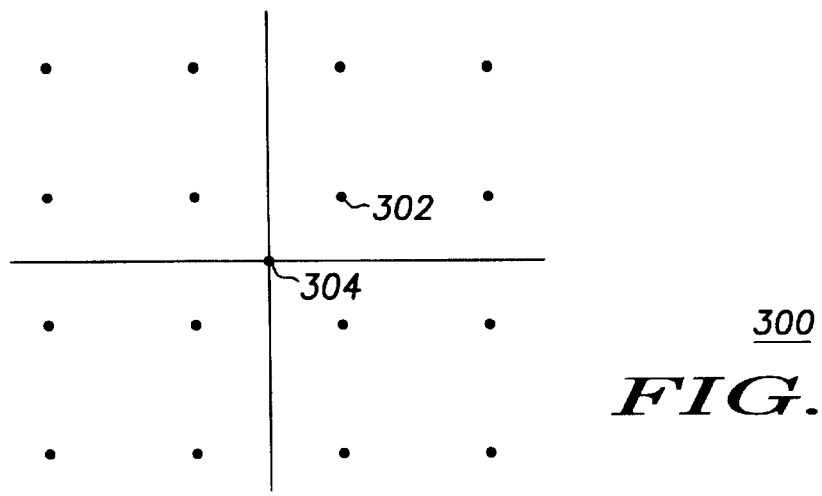
FIG. 3 is a graphical illustration of a 16-ary quadrature amplitude modulation symbol constellation in a complex two dimensional plane.

In the preferred embodiment, the truncated time slot 200 is constructed as follows. The transmitter 104 places three channel-related information symbols (i.e., synchronization symbols 210) in the first three symbol positions of each sub-channel 201–204 and interleaves the remaining channel-related information symbols 210, 211 with the comfort noise symbols 212 in each sub-channel 201–204. The channel-related information symbols 210, 211 are known to both the sending and receiving communication devices, but may or may not be a symbol represented in a 16-ary QAM constellation. The positioning of the channel-related information symbols 210, 210 is predetermined and is discussed below. If there are an insufficient number of comfort noise symbols 212 to fill all of the symbol positions prior to the last, in time, channel-related information symbol 210, 211, the processing unit 104 preferably fills the unused symbol positions with low power symbols 213 (e.g., symbols in positions 10–13, 15–21, 23–29, and 31–34 of sub-channel 501). FIG. 3 is an illustration of a 16-ary QAM constellation 300 in a complex plane. In the preferred embodiment, the comfort noise symbols 212 are symbols selected from the constellation of points 300, and a low power symbol 213 is a symbol in the inner portion of the constellation of points 300 (e.g., symbol 302) that has a small magnitude component with respect to the magnitude component of the other symbols in the constellation 300, or a symbol 304 in the center of the constellation 300 (i.e., a null symbol) that has a zero magnitude component.

In the preferred embodiment, the first portion of the time slot 200 comprises 40 comfort noise symbols 212 and 68 low power symbols 213. For example, in sub-channel 201, symbol positions 4, 5, and 7–9 contain comfort noise symbols 212 and symbol positions 10–13, 15–21, 23–29, and 31–34 contain low power symbols 213. The second portion of the time slot 200 comprises 12 synchronization symbols 210 and 16 channel quality symbols 211. Preferably, the sub-channels 201–204 each comprise three synchronization symbols 210 and at least four channel quality symbols 211. For example, in sub-channel 501, symbol positions 1–3 contain synchronization symbols 210 and symbol positions 6, 14, 22, and 30 contain channel quality symbols 211. The processing unit 104 positions the synchronization symbols 210 at the beginning of the time slot and positions the channel quality symbols 211 at pre-designated positions throughout the time slot. In the preferred embodiment, the channel-related information symbols 210, 211 are generated by a computer program stored in the processing unit 104.

In the preferred embodiment, the remaining 76 symbol positions in the time slot 200 (e.g., symbol positions 35–53 in sub-channel 201) are devoid of symbols 214 and are not transmitted. As shown in the time slot 200, the first and second portions of the time slot 200 occupy approximately 65 percent (136 positions out of 212 total positions) of the total symbol positions in the time slot 200. That is, the first and second portions of the time slot 200 together comprise approximately 65 percent of a duration of the time slot. Approximately 35 percent (76 positions out of a total of 212) of the symbol positions remain unused 214 and are not transmitted, thereby reducing battery drain during such 35 percent of the time slot 200.

In an alternate embodiment of the time slot 200, the first channel quality symbol 211 in each sub-channel 201–204 is adjacent to the synchronization symbols 210. In the alternate embodiment, the first portion of the time slot 200 comprises 40 comfort noise symbols 212 and 44 low power symbols 213 (approximately 40 percent of the 212 total symbol positions in the time slot 200) and the second portion of the time slot 200 comprises 28 channel-related information symbols 210, 211. Together, the first and second portions of the time slot 500 occupy approximately 53 percent (112 symbol positions out of a total of 212) of the total symbol positions. That is, the first portion of the time slot 200 comprises approximately 40 percent of a duration of the time slot 200 and together the first and second portions of the time slot 200 comprise approximately 53 percent of the duration of the time slot 200. Approximately 47 percent (100 out of 212) of the total symbol positions remain unused 214 and are not transmitted, thereby reducing battery drain during such 47 percent of the time slot 200.

In a second alternate embodiment of the time slot 200, the channel-related information symbols 210, 211 are not so widely spaced as shown in the time slot 200 and the need for utilizing low power symbols 213 to occupy first portion symbol positions is eliminated. Instead, the first portion of the time slot 200 comprises the 40 comfort noise symbols 212 (approximately 20 percent of the 212 available symbol positions in the time slot 500) and the second portion of the time slot 500 comprises 12 synchronization symbols 210 and 16 channel quality symbols 211. In the second alternate embodiment, approximately 33 percent (68 symbol positions out of a total of 212) of the available number of symbol positions are occupied with symbols and transmitted; whereas approximately 68 percent (144 out of 212) of the available number of symbol positions remain unused 214 and are not transmitted, thereby reducing battery drain during such 68 percent of the time slot 200.

In a third alternate embodiment of the time slot 200, the time slot 200 comprises comfort noise symbols 212 only. The comfort noise symbols 212 are positioned in a first portion of the time slot 200. Since there are 40 comfort noise symbols, approximately 19 percent (40 symbol positions out of a total of 212) of the available number of symbol positions are occupied with symbols and transmitted; whereas approximately 81 percent (172 out of 212) of the available number of symbol positions remain unused 514 and are not transmitted, thereby reducing battery drain during such 81 percent of the time slot 200.

While user information symbols 212, 213 have been shown herein as positioned in beginning positions of the time slot 200, those of ordinary skill in the art know that the user information symbols 212, 213 can be positioned anywhere in the time slot 200 (e.g., in middle positions or end positions of the time slot as well as in beginning positions).

Figure 4:
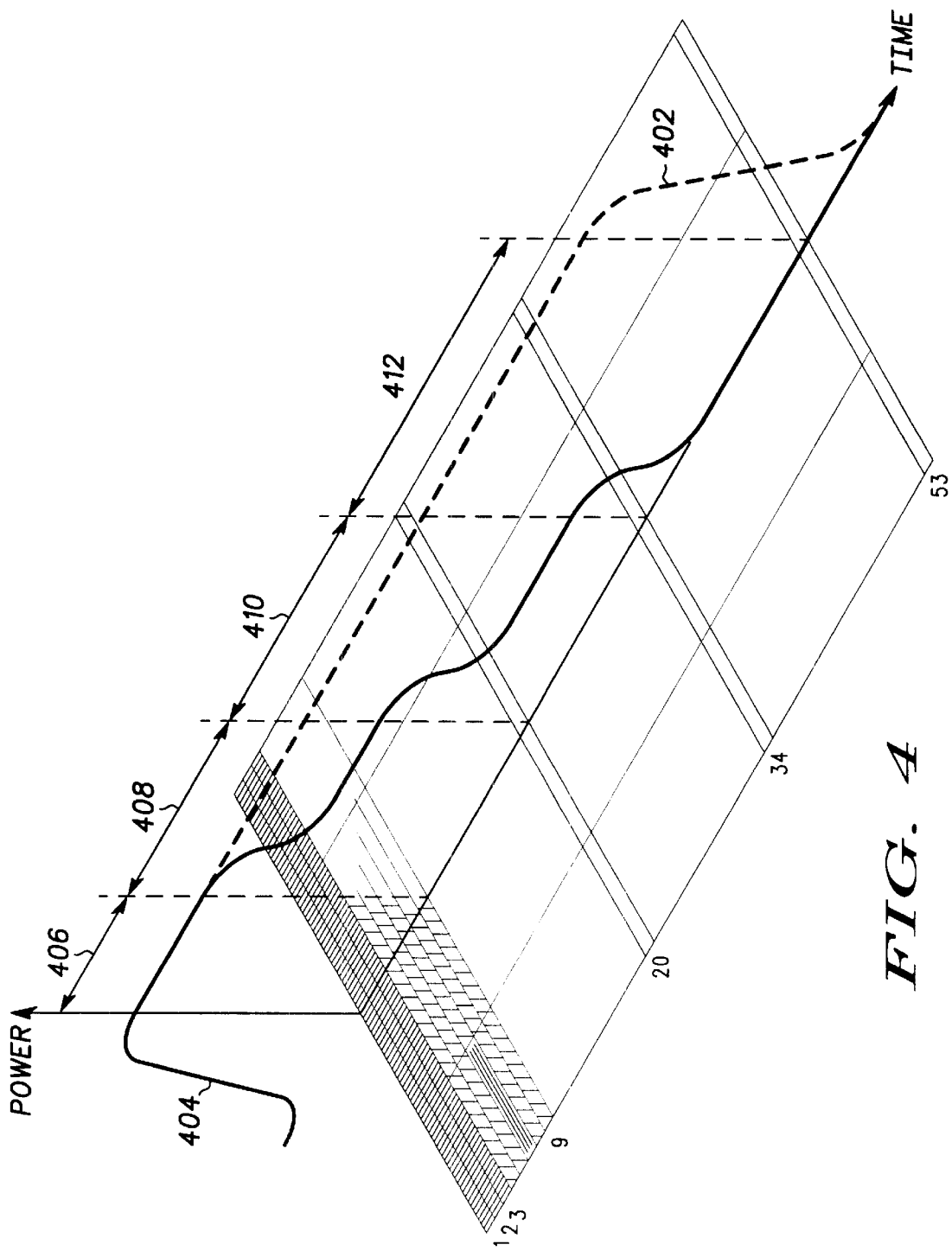
FIG. 4 is a graphical illustration of average symbol power contained in information symbols of a time slot in accordance with a preferred embodiment of the present invention.

FIG. 4 is a graphical illustration of average symbol power contained in the time slot 200. The broken-line curve 402 illustrates the average symbol power contained in a time slot when all 212 positions are filled with a combination of user information symbols (e.g., comfort noise symbols 212) and channel-related information symbols 210, 211. The continuos-line curve 404 illustrates the average symbol power contained in the time slot 200 when the time slot 200 also includes low power symbols 213 and empty symbol positions 214. As illustrated by FIG. 4 and detailed below, the present invention provides a time slot 200 of lower average symbol power and, therefore, lower transmission power consumption and less battery drain than a time slot completely filled with user information symbols and channel-related information symbols.

In FIG. 4, the first section 406 of curve 404 is a graphical illustration of the average symbol power in the time slot 200 when the symbol positions are filled with a combination of channel-related information symbols 210, 211 and comfort noise symbols 212. The power level illustrated by section 406 is equal to the power level of curve 402. The second section 408 of curve 404 is a graphical illustration of the average symbol power in the time slot 200 when the symbol positions are occupied by a combination of channel-related information symbols 210, 211, comfort noise symbols 212, and low power symbols 213. The power level illustrated by section 408 of curve 404 is lower than the power level of curve 402 due to the use of the low power symbols 213 to fill in the symbol positions preceding the last, in time, channel-related information symbol 210, 211, resulting in a disproportionate number of low power symbols 213 in time slot 200. The third section 410 of curve 404 is a graphical illustration of the average symbol power in the time slot 200 when the symbol positions are occupied by a combination of channel-related information symbols 210, 211 and low power symbols 213. The power level illustrated by section 410 of curve 404 is even lower than the power level of section 408 of curve 404 due to the further inclusion of the low power symbols 213 and the absence of any comfort noise symbol 212. The fourth section 412 of curve 404 is a graphical illustration of the average symbol power in the time slot 200 when the symbol positions are left empty 214. Since there are no symbols, the average symbol power level is zero. As FIG. 4 illustrates, the average symbol power of the time slot 200, as illustrated by curve 404, is less than the average symbol power of the full time slot represented by curve 402.

In general, the present invention provides an apparatus for reducing the amount of power consumed by a communication device 100 when transmitting information in a time slot that comprises multiple user information symbols. The communication device 100 generates multiple user information symbols 212, 213 and channel-related information symbols 210, 211 for transmission in the time slot 200. The user information symbols 212, 213 are positioned in a first portion of the time slot 200. The channel-related information symbols 210, 211 are positioned at predetermined locations in a second portion of the time slot 200. Together, the first portion and second portion of the time slot 200 occupy less time than the time slot. The communication device 100 transmits the user information symbols 212, 213 and the channel-related information symbols 210, 211 only during the first and second portions of the time slot 200. Unused portions 214 of the time slot 200 are not transmitted. The average symbol power of the time slot 200 is less than the average symbol power of a time slot that is completely filled with comfort noise symbols 212 and channel-related information symbols 210, 211. Thus, the amount of power consumed by the communication device 100 during the process of transmitting the time slot 200 is reduced as compared to the process of transmitting a time slot completely filled with either comfort noise symbols or channel-related information symbols, or both. Reduced power consumption results in reduced power drain on the battery 106, and the reduced power drain results in an increased rechargeable life of the battery 106.

Figure 5:
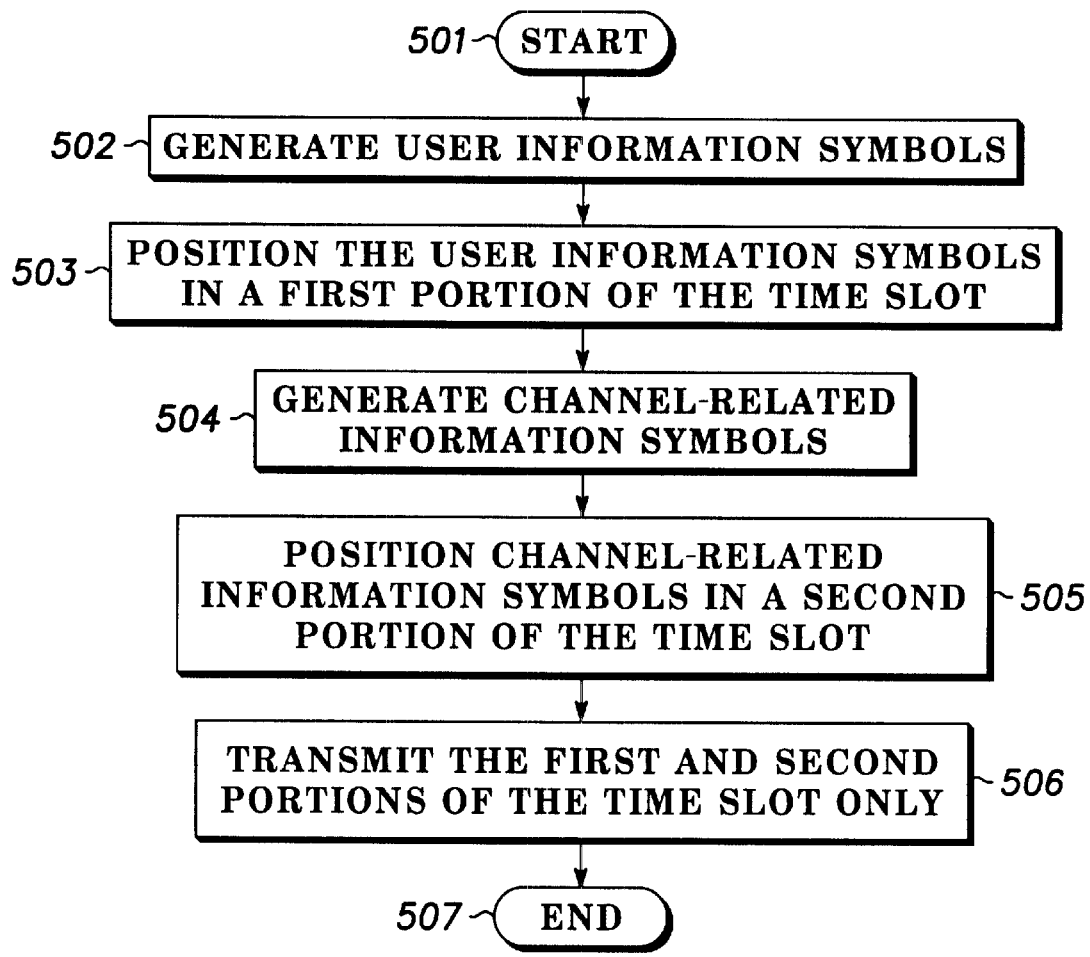
FIG. 5 is a logic flow diagram of steps executed by a communication device to transmit information in a time slot in accordance with a preferred embodiment of the present invention.

FIG. 5 illustrates a logic flow diagram 500 of steps executed by a communication device to transmit information symbols in a time slot in accordance with a preferred embodiment of the present invention. In the preferred embodiment, the time slot is part of a 16-ary QAM TDMA modulation scheme of the type used by Motorola in its "iDEN" system. The logic flow begins (501) when the communication device generates (502) multiple user information symbols and positions (503) the user information symbols in a first portion of the time slot. Preferably, the user information symbols are comfort noise symbols and, to the extent necessary to fill in empty symbol positions in the first portion of the time slot, low power symbols.

In the preferred embodiment, the communication device also generates (504) multiple channel-related information symbols that are necessary for a receiving device to determine the time-varying effects introduced by a radio communication channel on the user information symbols. Preferably, the channel-related information symbols comprise at least one synchronization symbol and at least four channel quality symbols. The communication device positions (505) the channel-related information symbols in predetermined positions in a second portion of the time slot. In the preferred embodiment, the user information symbols and the channel-related information symbols are generated by a computer program stored in a processor of the communication device. Preferably, the processor interleaves the user information symbols among the channel-related information symbols. Together, the first and second portions of the time slot form a truncated time slot that occupies less time than the entire time slot. The communication device transmits (506) the first and second portions of the time slot only, and the logic flow ends (507).

In general, the present invention, as described above with respect to FIG. 5, provides a method by which a communication device can reduce the amount of power consumed when transmitting information in a time slot comprising multiple information symbols. The communication device generates user information and channel-related information symbols and positions them in first and second portions of a time slot, respectively. Since the first and second portions of the time slot occupy less time than the entire time slot, and a disproportionate number of the user information symbols might be low power symbols, the average symbol power of the truncated time slot is less than the average symbol power of a time slot that is filled with user information and channel-related information symbols. Thus, the amount of power consumed by the communication device during the process of transmitting the truncated time slot is less than the amount of power consumed in transmitting a time slot completely filled with user information symbols and channel-related information symbols. Reduced power consumption results in reduced power drain on the power source (e.g., battery) for the communication device, and the reduced power drain results in an increased rechargeable life of the power source.

Figure 6:
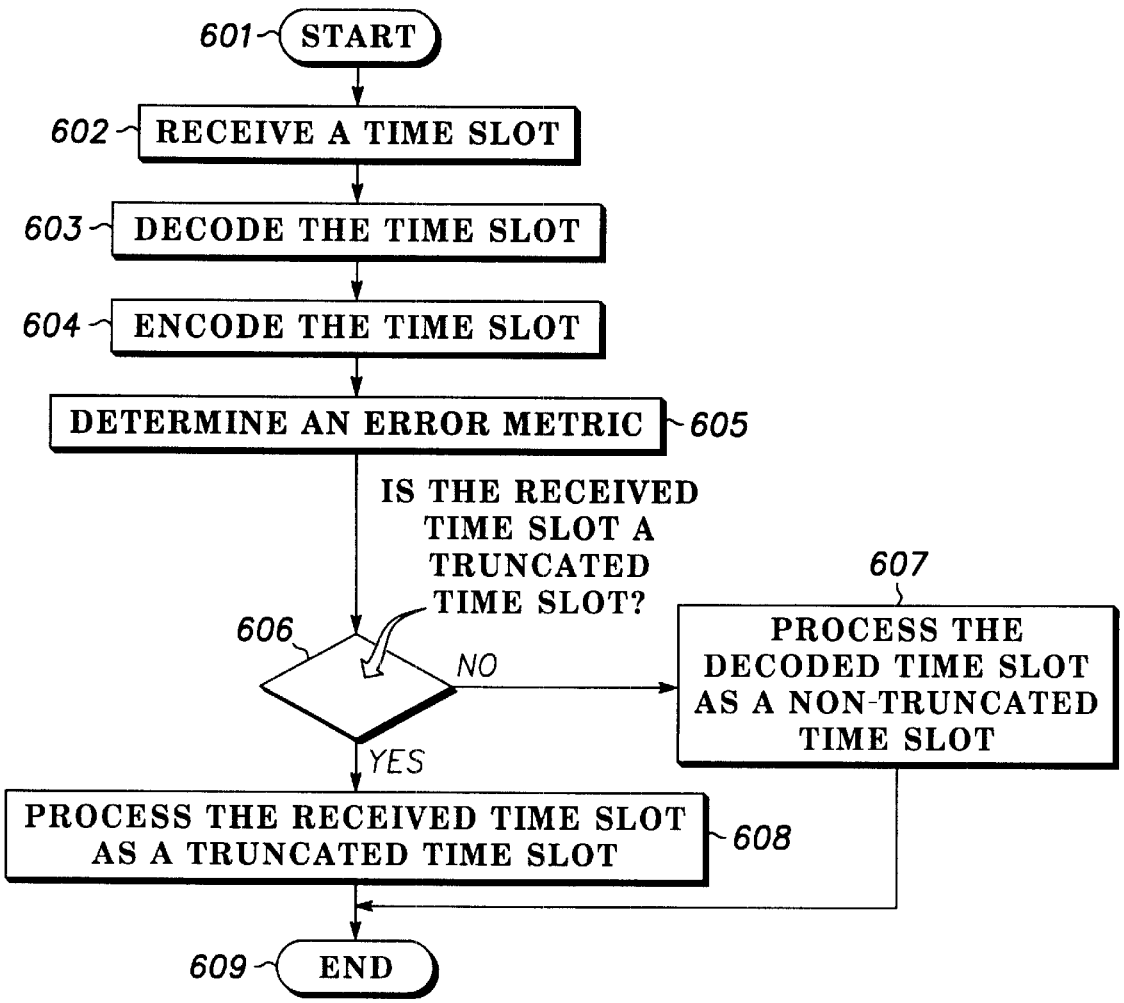
FIG. 6 is a logic flow diagram of steps executed by a communication device to receive information in accordance with a preferred embodiment of the present invention.

FIG. 6 illustrates a logic flow diagram 600 of steps executed by a communication device to receive information in accordance with a preferred embodiment of the present invention. The logic flow begins (601) when the communication device receives (602) a time slot to produce a received time slot. The communication device decodes (603) the received time slot, presuming the received time slot is not a truncated time slot to produce a decoded time slot. The communication device then encodes (604) the decoded time slot, presuming the decoded time slot is not a truncated time slot, to produce an encoded time slot. For example, suppose that the symbols received indicate three consecutive bits 011 and that the decoding scheme provides that the majority bit in a three-bit group is the intended bit. Thus 011 would decode to a 1 (and 001 would decode to a 0). In the preferred embodiment, the encoding scheme just adds redundancy, so the subsequent encoding of the decoded 1 would result in a three-bit group of 111.

The communication device determines (605) an error metric based on the encoded time slot and, based on the error metric, determines (606) whether the received time slot is a truncated time slot. In the preferred embodiment, the error metric is determined by comparing the encoded time slot to the received time slot. In the preferred embodiment, time slots are encoded through the application of a redundancy scheme (i.e., the insertion of redundant bits after user information bits). However, truncated time slots are encoded through the application of a redundancy scheme that is different from a redundancy scheme applied to non-truncated time slots. The communication device decodes and then encodes the received time slot by applying the redundancy scheme used for non-truncated time slots. The determination of whether the received time slot is a truncated time slot (e.g., a background noise time slot) is then based on whether the encoded time slot matches a predetermined percentage of the received time slot, wherein the predetermined percentage is such that a match of greater than the predetermined percentage indicates a non-truncated time slot and a match of less than the predetermined percentage indicates a truncated time slot.

When the received time slot is determined to be a truncated time slot, the communication device processes (607) the user information symbols contained in the received time slot presuming the received time slot is a truncated time slot. In the preferred embodiment, when the received time slot is determined to be a truncated time slot, then the communication device decodes the received time slot using the redundancy scheme used for truncated time slots, converts the bit stream to an analog information signal, and transmits the analog information signal to the user of the communication device, and the logic flow ends (609). If the received time slot is determined to be a non-truncated time slot, then the communication device processes the user information symbols contained in the decoded time slot presuming the decoded time slot is a non-truncated time slot (608), and the logic flow ends (609).

Generally, the present invention encompasses a method and apparatus for transmitting and receiving information in a time slot that includes multiple information symbols. With this invention, the amount of power consumed by a communication device during the process of transmitting the time slot is reduced as compared to the process of transmitting a time slot completely filled with user information symbols and channel-related information symbols. The amount of power consumed is reduced because a truncated time slot, as opposed to a completely filled time slot, is transmitted. The truncated time slot comprises user information symbols in a first portion of the time slot and channel quality and synchronization symbols in a second portion of the time slot, wherein the first and second portions together occupy less time than the entire time slot. Only the first and second portions of the time slot are transmitted, and since less than a full time slot is transmitted and since a disproportionate number of the user information symbols might be low power symbols, the transmission of the truncated time slot consumes less power than the transmission of a completely filled time slot. This reduced power consumption results in reduced power drain on the power source for the communication unit, and the reduced power drain results in an increased rechargeable life of the power source.

While the present invention has been particularly shown and described with reference to particular embodiments thereof, it will be understood by those skilled in the art that various changes in form and details may be made therein without departing from the spirit and scope of the present invention.

We claim:

1. A method for transmitting information in a time slot at a reduced level of power consumption by the transmitting communication device, the method comprising:
   generating a plurality of user information symbols;
   positioning the plurality of user information symbols in a first portion of the time slot, the first portion occupying less time than the time slot;
   transmitting the first portion of the time slot; and
   ceasing to transmit information in a remaining portion of the time slot, wherein the plurality of user information symbols includes information symbols that are indicative of background noise detected by the communication device during a time period when a user of the communication device is silent.

2. The method of claim 1, wherein the plurality of user information symbols includes low power symbols having power levels that are less than an average power level of a user information symbol.

3. The method of claim 1, wherein the first portion of the time slot comprises at most 40 percent of a duration of the time slot.

4. The method of claim 1, wherein the first portion of the time slot comprises at most 20 percent of an available number of symbol positions in the time slot.

5. A method for transmitting information in a time slot at a reduced level of power consumption by the transmitting communication device, the method comprising:
   generating a plurality of user information symbols;
   generating a plurality of channel-related information symbols, the plurality of channel-related information symbols being used at least to determine effects of the radio communication channel on transmission of the plurality of user information symbols;
   positioning the plurality of user information symbols in a first portion of the time slot,
   positioning the plurality of channel-related information symbols in predetermined locations within a second portion of the time slot, the first portion and the second portion collectively occupying less time than the time slot;
   transmitting the first portion of the time slot and the second portion of the time slot; and
   ceasing to transmit information in a remaining portion of the time slot, wherein the plurality of user information symbols includes information symbols that are indicative of background noise detected by the communication device during a time period when a user of the communication device is silent.

6. The method of claim 5, wherein the plurality of channel-related information symbols comprise at least one synchronization symbol and the plurality of user information symbols are positioned directly after the at least one synchronization symbol.

7. The method of claim 5, wherein the user information symbols and the channel-related information symbols are conveyed via a plurality of sub-channels.

8. The method of claim 5, wherein the first portion and the second portion of the time slot comprise at most 65 percent of a duration of the time slot.

9. The method of claim 5, wherein the first portion and the second portion of the time slot comprise at most 33 percent of an available number of symbol positions in the time slot.

10. A method of receiving information in a time slot, the method comprising the steps of:
   receiving a time slot to produce a received time slot;
   decoding the received time slot presuming that the time slot is not a truncated time slot, wherein a truncated time slot includes user information symbols in a first portion of the truncated time slot, the first portion of the truncated time slot occupying less time than the time slot, to produce a decoded time slot;
   encoding the decoded time slot presuming that the time slot is not a truncated time slot to produce an encoded time slot;
   determining an error metric of the encoded time slot;
   determining whether the encoded time slot is a truncated time slot based on the error metric; and
   when the encoded slot is determined to be a truncated time slot, processing the user information symbols in the received time slot presuming the received time slot is a truncated time slot.

11. The method of claim 10, wherein a truncated time slot includes user information symbols in a first portion of the truncated time slot and channel-related information symbols in a second portion of the truncated time slot, the first portion and the second portion of the truncated time slot together occupying less time than the time slot.

12. The method of claim 10, further comprising the step of processing the user information symbols in the decoded time slot presuming the decoded time slot is not a truncated time slot, when the encoded slot is not a truncated time slot.

13. The method of claim 10, wherein the step of determining an error metric comprises the step of comparing the encoded time slot to the received time slot.

14. The method of claim 13, wherein the step of determining whether the encoded time slot is a truncated time slot comprises the steps of:

determining whether the encoded time slot matches at most a predetermined percentage of the received time slot; and when encoded time slot matches at most a predetermined percentage of the received time slot, determining that the encoded time slot is a truncated time slot.

15. A communication device comprising:

an information source that generates user information symbols;

a processing unit, coupled to the information source, that receives the user information symbols, that positions the user information symbols within a first portion of a time slot, the first portion of the time slot occupying less time than the time slot; and a transmitter, coupled to the processing unit, that transmits the first portion of the time slot and ceases transmitting information in a remaining portion of the time slot, wherein the user information symbols include information symbols that are indicative of background noise detected by the communication device during a time period when a user of the communication device is silent.

* * * * *